Feb. 23, 1971   D. T. CANNON   3,564,644
AUTOMATIC POULTRY BREAST CUTTER
Original Filed March 27, 1968   3 Sheets-Sheet 1

INVENTOR.
DAVID T. CANNON
BY
ATTORNEY.

Feb. 23, 1971 — D. T. CANNON — 3,564,644
AUTOMATIC POULTRY BREAST CUTTER
Original Filed March 27, 1968 — 3 Sheets-Sheet 3
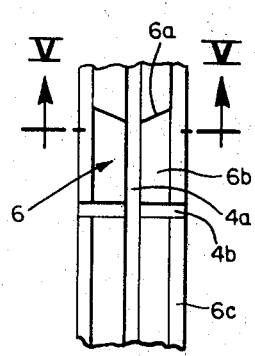
Fig. 4
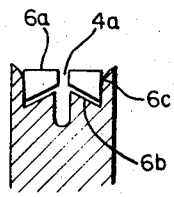
Fig. 5
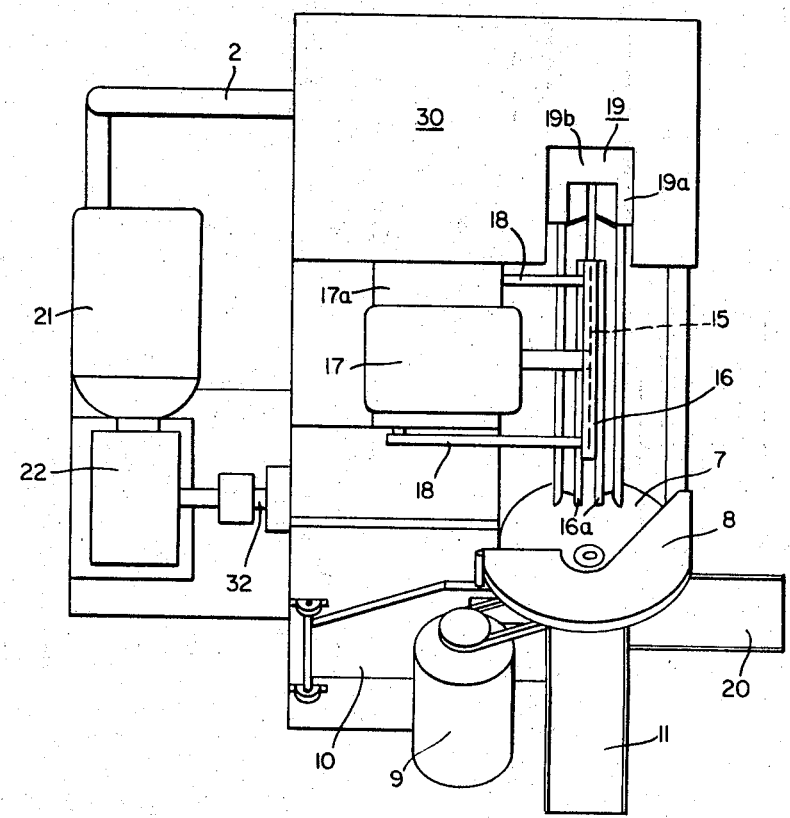
Fig. 3
Fig. 7
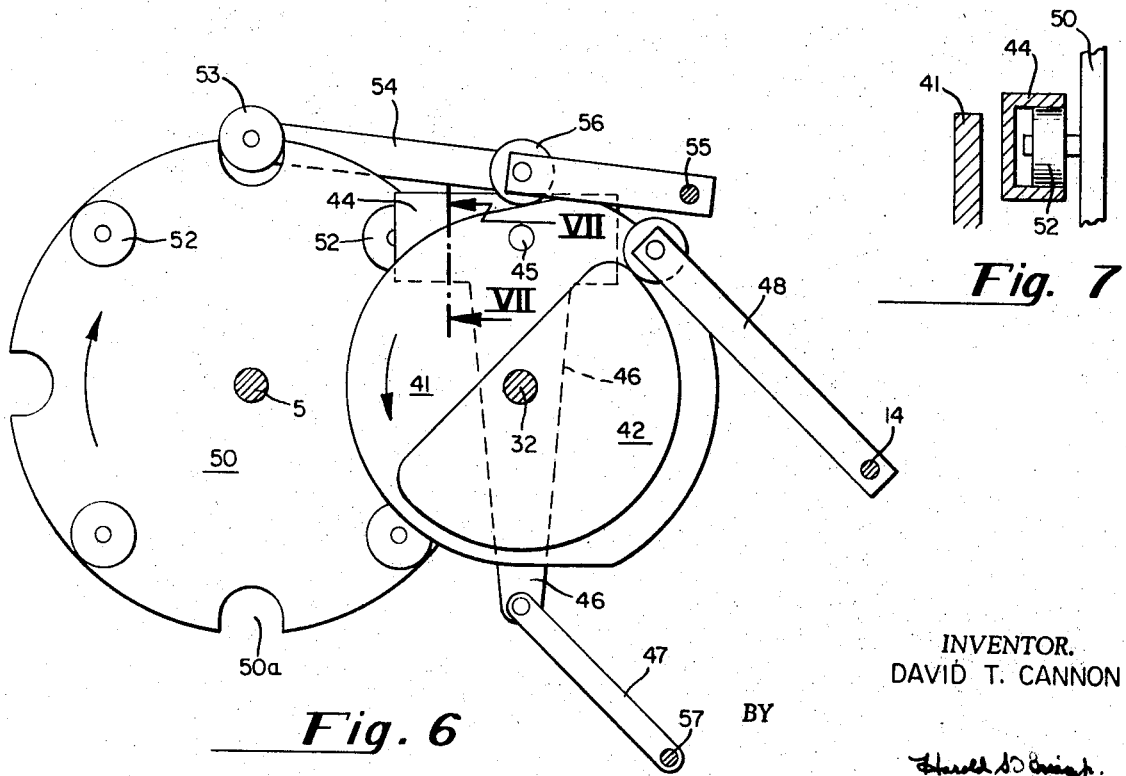
Fig. 6
INVENTOR.
DAVID T. CANNON
BY
ATTORNEY.

United States Patent Office 3,564,644
Patented Feb. 23, 1971

3,564,644
AUTOMATIC POULTRY BREAST CUTTER
David T. Cannon, 1018 Rainbow Ave.,
Pensacola, Fla. 32505
Continuation of application Ser. No. 716,396, Mar. 27, 1968. This application Dec. 8, 1969, Ser. No. 882,862
Int. Cl. A22c 21/00
U.S. Cl. 17—11      6 Claims

ABSTRACT OF THE DISCLOSURE

Apparatus for slicing poultry breasts or the like into at least four sections which includes a support for carrying a series of breasts consecutively along a selected path of travel, the support having a pair of slots formed therein, one slot being in the direction of the path of travel and the other slot being transverse to the path. A first rotary cutter saw is mounted for cutting action in the direction of and along the path of travel so that as the breast on the support moves through one portion of the path, the cutting edge passes through the breast along the first slot dividing the breast into two sections. A second rotary saw is mounted for cutting action in a direction transverse to the path of travel and for intermittent, reciprocal movement into and away from the path so that when the second saw is moved into the path of travel the cutting edge passes through the second slot in the support and slices the breast transversely into four sections. Drive means and control means are provided to periodically move the second saw into cutting position when the support and breast are stationary at a selected location and move the saw away from the support when the support and breast are in motion.

---

This application is a continuation application of applicant's prior, copending application Ser. No. 716,396, filed on Mar. 27, 1968, now abandoned claim being made to the filing date of the former application.

This invention relates to apparatus and process for cutting poultry breasts, such as chicken breasts, particularly machines of the automatic type.

The food industry follows the practice to a large extent of slicing poultry breasts, after the breast has been separated from the remaining portions of the fowl, by requiring a worker to hold the slippery breast in his hands and pass the breast once or twice through a high speed band saw. This practice is not only time consuming and results in unequal sections but poses a constant threat of bodily harm to the operator. Although a few automatic machines have been developed to slice breasts in one direction, usually lengthwise, such as those shown in U.S. Pat. Nos. 3,284,846, and 2,807,046, there are no machines designed to cut a breast in a transverse direction also and thereby divide the breast into four sections.

SUMMARY OF THE INVENTION

It is the primary object of the present invention to provide a high speed, automatic breast cutting machine and process which slices poultry breasts accurately into two or more sections as desired.

This and other objects of the invention which will become more apparently from the disclosure herein have been satisfied by the provision of a machine which includes an intermittently rotating drum or conveyor to support and move a series of poultry breasts through the cutting operation; two saws to cut each breast longitudinally and laterally; drive mechanism to rotate the drum intermittently and to provide reciprocating movement for the lateral saw, together with necessary control apparatus and supporting structure.

The preferred form of the apparatus of this invention is shown in the attached drawings, wherein:

FIG. 3 is a top view of the breast cutter;

FIG. 4 is a partial top view of the periphery of the drum;

FIG. 5 is a sectional view of the drum taken along the lines and arrows V—V of FIG. 4;

FIG. 6 is a diagrammatic view of the drive mechanism; and

FIG. 7 is a sectional view of one part of the drive mechanism taken along the lines and arrows VII—VII of FIG. 6.

Figure 1:
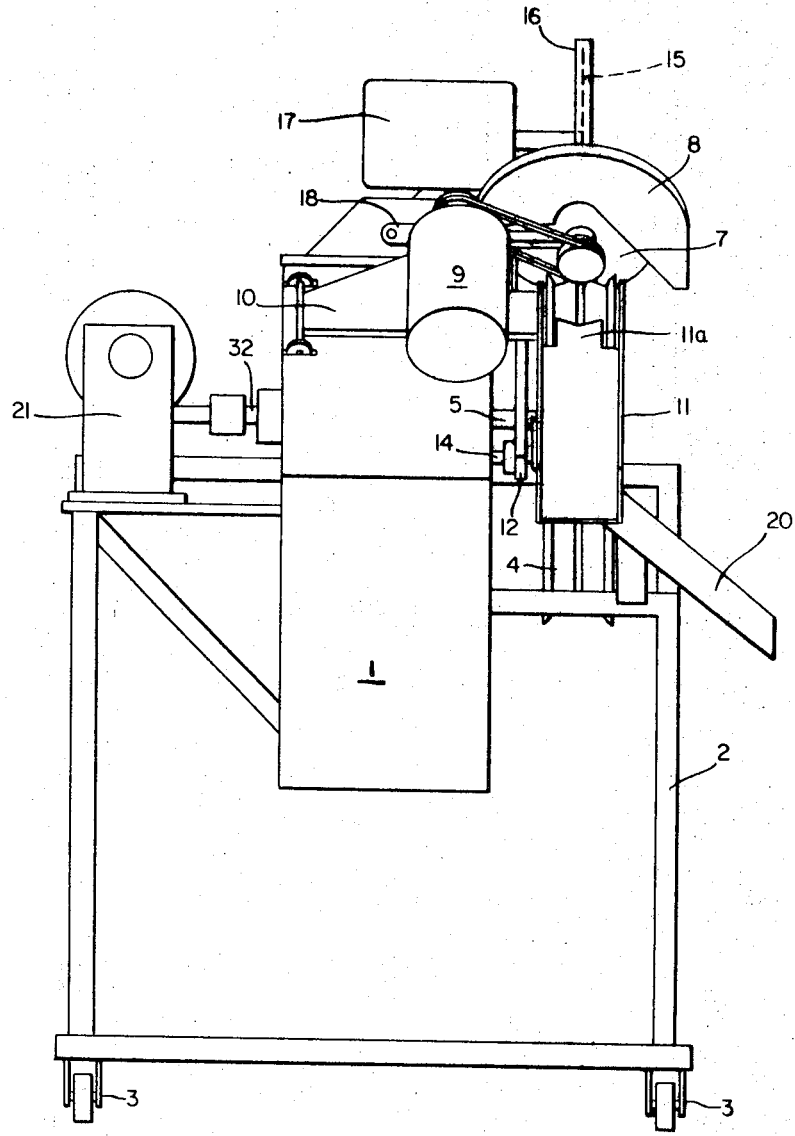
FIG. 1 is an end view in elevation of the breast cutter showing the discharge structure.
Figure 2:
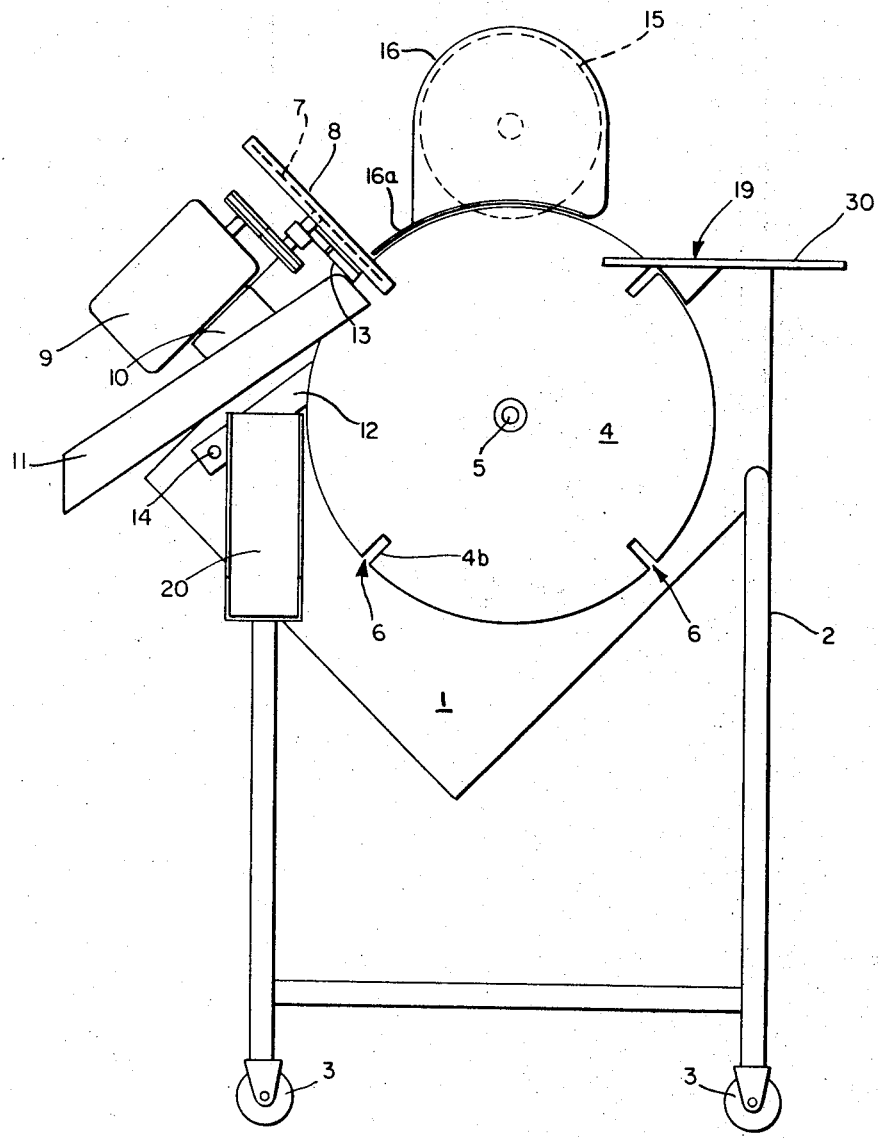
FIG. 2 is a side view in elevation of the breast cutter.

In greater detail, the preferred form of the automatic poultry breast cutter of my invention, which is shown best in FIGS. 1–3, includes a gear case 1 and a generally rectangular supporting frame 2 which is equipped with supporting casters 3 to provide mobility.

A flat cylindrical drum 4 (FIG. 2), preferably formed of stainless steel, is mounted parallel to the side of case 1 on a drive shaft 5 for rotation generally within a vertical plane. The drum in this instance is equipped with four, breast-holding trays 6, shown in detail in FIGS. 4 and 5, which are located at four, equidistant positions around the circumference of the drum. Drum 4 is provided with a peripheral center groove or slot 4a which extends completely around the circumference of the drum in which the cutting edge of a first rotary saw 15 operates as the drum rotates (FIG. 2). The drum is also provided with four transverse or lateral grooves or slots 4b which are located around the periphery of the drum and through which the cutting edge of a second, transverse rotary saw 7 operates intermittently.

Each of the poultry-holding trays 6 as shown in FIGS. 4 and 5, is defined by a pair of angled rear flanges 6a, a base 6b and opposing curved side flanges 6c. The rear flanges 6a have their inner ends displaced forward in the direction of rotation to enter the V opening at the shoulder end of the chicken breast. These flanges are mounted on the drum so that they can be adjusted to accommodate different size breasts. The side flanges 6c are flared outwardly to facilitate placing the breast on the drum and to retain the breast thereon during the cutting operation. Through each tray extends the longitudinal slot 4a of the drum to permit the passage of saw 15 and the transverse slot 4b to permit passage of saw 7. Flanges 6a cooperate with side flanges 6c to hold the breast in the tray as the drum rotates and to properly locate each breast in relation to both the longitudinal and transverse slots through which the saws 15 and 7 will cut the breast.

A first rotary saw 15, radially located from and in the same vertical plane as drum 4, is equipped with a covering guard 16 as shown in FIG. 2, and driven by electric motor 17 secured by a bracket 17a on top of the case 1. The lower arc of the cutting edge of saw 15 passes into and through the longitudinal slot 4a in drum 4 to cut the breast lengthwise. Saw guard 16 is hinged by arms 18 (FIGS. 1 and 3) to a bracket on case 1 to allow the guard to rise upwardly when a breast passes beneath it on drum 4. The accurately shaped, extended lower edges 16a of the saw guard 16 (FIG. 2) follow the periphery of the drum 4 and extend between the longitudinal saw 15 and the transverse saw 7 to provide guides for each breast as the drum rotates. The edges 16a rest upon the top of each breast and the weight of the guard provides the force necessary to hold each breast on the drum.

A second rotary saw 7, saw-guard 8 and drive motor 9 are mounted on a reciprocating saw platform 10 which is hinged to case 1 (FIGS. 1, 2, and 3). Platform 10 reciprocates in a direction generally radially to drum 4 so that when the platform moves into its lower position, the cutting edge of saw 7 passes through transverse slot 4b in the drum and tray as shown in FIG. 2. The face of saw 7 is generally transverse to that of saw 15 and lies within a plane in which the axis of drum 4 may be found. When platform 10 moves upwardly, away from the drum, saw 7 is withdrawn from a slot. Platform 10 is connected to arm 12 by link 13 and arm 12 is keyed to shaft 14 (FIGS. 1 and 2). A U-shaped tip chute 11 is fastened to the saw platform 10 and moves with the saw. The top end 11a of the chute (FIG. 1) fits within the side flanges 6c of the drum when the platform is in its lower position to catch the severed tips of the breasts after they have been severed by the transverse saw 7. Saw guard 8 may be hinged at its inner end to permit opening to facilitate cleaning of saw 7.

The top of the gear case 1, as shown best in FIG. 3, extends around the drum to support a work deck 30 for loading the drum and a loading chute 19. Chute 19 generally intersects the periphery of the drum (FIG. 3); it has sides 19a which extend a short distance along opposing faces of the drum and a center portion 19b which is located just forward of flanges 6a in the tray 6 when the drum is stopped in the correct position.

An inclined, U-shaped shoulder breast chute 20 (FIGS. 2 and 3) is stationarily mounted adjacent to the periphery of drum 4 and perpendicular to the tip chute 11 to receive the severed rear segments of the breasts after the tips have dropped down chute 11. A standard electric motor 21 and gear box 22 are mounted on one side of case 1 to provide the necessary power and the output shaft (not shown) of the motor is connected to the input shaft 32 of the drive mechanism as further described in connection with FIG. 6. All parts of the breast cutter which come into contact with the product are preferably formed of stainless steel.

To operate and control movement of the apparatus described, drive mechanism is provided as shown in the preferred form in FIG. 6. The mechanism basically provides two, interrelated functions; an intermittent rotary movement to drive the drum 4 and an oscillating movement for the lateral cutting saw 7. Referring to FIG. 6, the mechanism includes a drive cam 41 and a saw cam 42 both keyed to a power input shaft 32. The inner end of the input shaft is flush with the inner face of the drive cam. A drive channel 44 is mounted on a shaft 45 which extends from the inner face of the drive cam 41, said channel being free to rotate on shaft 45. The drive channel has an arm 46 affixed to it at a right angle which extends somewhat below the periphery of the drive cam 41. A radius arm 47 is connected at one end to the lower end of the channel arm 46 and at the other end bears on a shaft 57 affixed to the case. A saw cam follower 48 is keyed to the platform operating shaft 14 which extends through the drum side of the case and is shown in FIGS. 1 and 2. A drum drive plate 50 is keyed to the drum drive shaft 5 with the inner face of the drive plate flush with the inner end of the drum drive shaft. The drive plate has a number of extended, inner ring bearings 52 affixed to the inner face equidistant from its center and disposed at equal angles about the plate. These bearings have a radius from the center of the drive plate such that the center-line distance of any two adjacent bearings equals the diameter of a circle described by the center of shaft 45 as it rotates. The drive plate 50 is notched in its periphery between adjacent bearings, the notches 50a being disposed from each other in the same number of degrees of arc as the bearings. The notches are of sufficient width and depth to allow locking pawl 53 to enter and exit freely so that when in a notch, the center of the locking pawl is just inside the circumference of drive plate 50. The locking pawl 53 is attached to the locking arm 54 which is keyed to the locking shaft 55. The lock cam follower 56 is keyed to the same shaft.

Operation of the preferred form of my invention may be described as follows. A poultry breast is inserted via the loading chute 19 into one of the drum trays 6 with the shoulder or front end of the breast rearward and to the right as shown in FIG. 2 and the tip or rear end forward toward the left or in the direction of the longitudinal saw 15. Of course, the inside of the breast faces downwardly by against the drum. When the machine starts, the input shaft 32 rotates counterclockwise as shown in FIG. 6 causing the saw cam follower 48 to be lifted to the lobe of the saw cam 42 thus rotating the platform operating shaft 14 a few degrees forcing the lateral saw platform 10 upward and lifting the lateral saw 7 out of or away from the lateral cut in the drum tray 6. Further rotation of the input shaft 32 causes the drive cam 41 to commence the unlocking of the drive plate 50 and to engage the drive channel 44 with one of the bearings 52. The vertical velocity of the drive channel 44 is zero at the instant of engagement of the bearing. As rotation continues, the unlocking is completed and the vertical velocity of the drive channel gradually increases for the first 90° (approximately) of the engaged travel and decreases in the last 90°, rotating the drive plate 50 and drum drive shaft 5 in the direction indicated (clockwise). The drive channel 44 is kept generally horizontal through the first 180° of engagement by the action of the channel arm 46 and the radius arm 47. As rotation continues and the drive channel nears 180° of travel, its vertical velocity approaches zero and the locking pawl 53 enters a notch 50a in the drive plate 50. The locking action is completed at the instant of disengagement of the drive channel and bearing. Rotation of the drum shaft 5 causes the drum to rotate counterclockwise, as shown in FIG. 2, forcing the breast under the longitudinal saw and thus splitting the breast longitudinally into two sections. The guide extensions 16a of the longitudinal saw guard 16 retain the breast in its position on the drum tray after drum rotation ceases. The drum now being locked stationary, the input shaft 32 continues to rotate and brings the heel of the saw cam 42 under its cam follower thus allowing gravity to pull the lateral saw 7 into the lateral cut in the drum tray and simultaneously bringing the tip chute 11 into position to receive the breast tips when they are severed by the lateral saw. The cycle is then completed. When drum rotation commences on the next cycle, the shoulder ends of the breast are rotated from under the longitudinal saw guide extensions 16a and drop from the tray into the shoulder chute 20.

It will be apparent from the description set forth herein that the automatic breast cutter of my invention reduces handling of the chicken breasts required and reduces the number of personnel involved in the breast-cutting operation. There is less waste as each breast is cut at the same places resulting in equal sections. The simplicity of construction of the external moving parts and their accessibility for cleaning improves sanitation and the ease of repair. The absence of exposed cutting edges reduces hazards to the operator.

An intermittent movement, such as the one described, is superior in that neither the arm of the driven member nor that of the drive member is shortened during the central portion of the drive cycle thus the velocity changes of the driven member are less abrupt and stress requirements of the entire mechanism are less. The driven member is positively controlled by the drive member during the entire drive cycle. There are no shock loads as the lineal drive velocity of the drive member is zero at the instant of engagement and dis-engagement of the drive member and driven member.

Certain modifications in the preferred form of the apparatus and process as described will be apparent to those skilled in the art. For example, an endless chain conveyor may be substituted in place of the cylindrical drum and cam operated, positive breast grasping apparatus may be substituted in and for each tray in place of the side flanges.

However, all such modifications will be within the scope of the invention.

I claim:
1. Apparatus for slicing poultry breasts and the like into a plurality of sections comprising:
   a support to carry an unsliced breast intermittently along a selected path of travel, said support having a pair of slots formed therein, a first slot being in the direction of the path of travel and the second slot being transverse to the path;
   a first cutting edge mounted for cutting action in the direction of and along the path of travel so that upon movement of the support through one portion of the path of travel the first cutting edge passes through the first slot of the support;
   a second cutting edge mounted for cutting action in a direction transverse to the path of travel and for intermittent, generally radial movement into and away from the path, said edge passing through the second slot in the support when the support is positioned at a selected location along the path of travel; and
   means controlling movement of the second cutting edge in relation to movement of the support whereby the cutting edge passes through the second slot of the support when the support is stationary at a selected location along the path of travel and moves away from the support when the support is in motion.

2. The apparatus as defined in claim 1 wherein means is provided to hold the breast on the support and over the pair of slots in a desired position so that when the cutting edges pass through the slots the breast is sliced into four sections.

3. The apparatus as defined in claim 2 further including:
   means for feeding breasts to the support consecutively, said means located adjacent to one portion of the path of travel of the support.

4. The apparatus as defined in claim 3 wherein the cutting edges comprise a pair of rotary saws; and
   the support comprises a drum whose circumferential edge defines the selected path of travel of a breast, the drum edge having a first slot formed around its periphery in the direction of rotation of the drum and having a plurality of second slots transverse to the first slot at selected locations, a breast being placed at each location where the first and second slots intersect.

5. Apparatus for slicing poultry breasts into four segments comprising:
   a cylindrical drum to support and move at least one unsliced breast intermittently along a path of travel, the circumferential surface of the drum having a first slot extending entirely around the drum and at least one second slot formed in the surface at a selected location and extending transverse to the first slot;
   a first rotary saw located radially from the drum and in the same plane as the drum having a cutting edge continuously passing through the first slot as the drum rotates,
   a second rotary saw located radially from the drum and in a plane transverse to that of the drum, said second saw being mounted for intermittent, generally radial movement toward and away from the circumferential surface of the drum, the cutting edge of the second saw passing through the second slot in the drum when the saw is moved toward the surface of the drum, and
   means controlling movement of the second saw in relation to rotation of the drum whereby the cutting edge passes through the second slot of the drum when the drum is stationary at a selected location and moves away from the drum when the drum is rotating.

6. The apparatus as defined in claim 5 wherein means is provided to hold each breast on the drum at each location where a transverse slot crosses the first slot so that each breast remains stationary on the drum while the cutting edges of the saws pass through the slots slicing the breast into four segments.

References Cited

UNITED STATES PATENTS

| | | | |
|---|---|---|---|
| 2,562,452 | 7/1951 | Fischbach | 146—73X |
| 2,766,477 | 10/1956 | Dahlberg | 17—11 |
| 2,807,046 | 9/1957 | Hebenheimer | 17—11 |
| 2,811,742 | 11/1957 | Jackson | 17—11 |
| 2,941,238 | 6/1960 | Reeves | 17—11 |
| 2,957,198 | 10/1960 | Cianciolo et al. | 17—11 |
| 3,284,846 | 11/1966 | Reeves | 17—11 |

LUCIE H. LAUDENSLAGER, Primary Examiner

U.S. Cl. X.R.

17—52; 146—78